US012683398B2

(12) United States Patent
Matsuo et al.

(10) Patent No.: US 12,683,398 B2
(45) Date of Patent: Jul. 14, 2026

(54) POWER MANAGEMENT APPARATUS AND POWER MANAGEMENT METHOD

(71) Applicant: KYOCERA CORPORATION, Kyoto (JP)

(72) Inventors: Takahisa Matsuo, Kyoto (JP); Takashi Suenaga, Kyoto (JP); Kazumasa Shichiri, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 358 days.

(21) Appl. No.: 18/292,339

(22) PCT Filed: Jul. 11, 2022

(86) PCT No.: PCT/JP2022/027195
§ 371 (c)(1),
(2) Date: Jan. 26, 2024

(87) PCT Pub. No.: WO2023/008154
PCT Pub. Date: Feb. 2, 2023

(65) Prior Publication Data
US 2024/0348051 A1     Oct. 17, 2024

(30) Foreign Application Priority Data
Jul. 28, 2021     (JP) .................................. 2021-123176

(51) Int. Cl.
*H02J 3/14*          (2026.01)
*H02J 3/00*          (2026.01)
        (Continued)

(52) U.S. Cl.
CPC ................ *H02J 3/14* (2013.01); *H02J 3/003* (2020.01); *H02J 3/28* (2013.01); *H02J 3/38* (2013.01); *H02J 13/12* (2026.01); *H02J 2101/24* (2026.01)

(58) Field of Classification Search
CPC ...... H02J 3/14; H02J 3/003; H02J 3/28; H02J 3/38; H02J 13/12; H02J 2101/24; H02J 13/00; H02J 3/32
See application file for complete search history.

(56) References Cited

U.S. PATENT DOCUMENTS

2014/0371942 A1* 12/2014 Matsuyama .............. G05F 1/66
                                                                                700/297

FOREIGN PATENT DOCUMENTS

JP          2014183640 A      9/2014

* cited by examiner

*Primary Examiner* — Charles R Kasenge
(74) *Attorney, Agent, or Firm* — HAUPTMAN HAM, LLP

(57)                    ABSTRACT

A power management apparatus acquires, as time-series data, a measurement result of a measurement device configured to measure, at a predetermined interval, power supplied to a load from a power socket installed in a facility. A controller classifies the time-series data into first data before a first condition is satisfied and second data after the first condition is satisfied when the time-series data satisfies the first condition. The first and second data correspond to time-series data of a first load device and a second load device. The controller predicts power consumption of the second load device based on the second data, and the first condition stipulates that a difference between the n-th round (n is an integer of 1 or more) measurement result and the (n+x)-th round (x is an integer of 2 or more) measurement result is equal to or greater than a predetermined difference.

17 Claims, 11 Drawing Sheets

(51) Int. Cl.
| | |
|---|---|
| *H02J 3/28* | (2006.01) |
| *H02J 3/38* | (2006.01) |
| *H02J 13/12* | (2026.01) |
| *H02J 101/24* | (2026.01) |

---------- POWER LINE

————— SIGNAL LINE

| PAST POWER CONSUMPTION | | OFFSET |
|---|---|---|
| MAXIMUM VALUE | MINIMUM VALUE | |
| 2000 | 1501 | 150 |
| 1500 | 1001 | 100 |
| 1000 | 501 | 50 |
| 500 | 1 | 25 |

FIG. 12

POWER MANAGEMENT APPARATUS AND POWER MANAGEMENT METHOD

RELATED APPLICATIONS

The present application is a National Phase of International Application Number PCT/JP2022/027195 filed Jul. 11, 2022, which claims the benefit of priority from Japanese Patent Application No. 2021-123176, filed on Jul. 28, 2021.

TECHNICAL FIELD

The present invention relates to a power management apparatus and a power management method.

BACKGROUND OF INVENTION

In recent years, there has been known a technology of using distributed power supplies such as power storage apparatuses installed in facilities in the event of a disaster or the like. For example, a technology has been proposed in which the power consumption of load devices during a planned power outage period is predicted and the remaining power storage level of a power storage apparatus equivalent to the power consumption of load devices is secured before the planned power outage period starts (For example, Patent Document 1).

CITATION LIST

Patent Literature

Patent Document 1: JP 2014-183640 A

SUMMARY

A power management apparatus according to the present disclosure includes an acquiring unit configured to acquire, as time-series data, a measurement result of a measurement device from the measurement device, the measurement device being configured to measure, at a predetermined interval, power supplied to a load device from a power socket installed in a facility; and a controller configured to execute first processing of classifying the time-series data into first time-series data being time-series data before a first condition is satisfied and second time-series data being time-series data after the first condition is satisfied, when the time-series data satisfies a first condition. In the power management apparatus, on an assumption that the first time-series data corresponds to time-series data of a first load device and the second time-series data corresponds to time-series data of a second load device, the controller executes second processing of predicting power consumption of the second load device, based on the second time-series data, and the first condition stipulates that a difference between an n-th round (n is an integer of 1 or more) measurement result and an (n+x)-th round (x is an integer of 2 or more) measurement result is equal to or greater than a predetermined difference.

A power management method according to the present disclosure includes acquiring, as time-series data, a measurement result of a measurement device from the measurement device, the measurement device being configured to measure, at a predetermined interval, power supplied to a load device from a power socket installed in a facility; executing first processing of classifying the time-series data into first time-series data being time-series data before a first condition is satisfied and second time-series data being time-series data after the first condition is satisfied, when the time-series data satisfies a first condition; and executing, on an assumption that the first time-series data corresponds to time-series data of a first load device and the second time-series data corresponds to time-series data of a second load device, second processing of predicting power consumption of the second load device based on the second time-series data. In the power management method, the first condition stipulates that a difference between an n-th round (n is an integer of 1 or more) measurement result and an (n+x)-th round (x is an integer of 2 or more) measurement result is equal to or greater than a predetermined difference.

BRIEF DESCRIPTION OF THE DRAWINGS

FIG. 12 is a table for explaining the offset according to the variation 2.

DESCRIPTION OF EMBODIMENTS

Embodiments will be described below with reference to the accompanying drawings. Note that in the following description of the drawings, the same or similar components will be denoted by the same or similar reference signs. However, the drawings are schematic.

Embodiment

Power Management System

Figure 1:
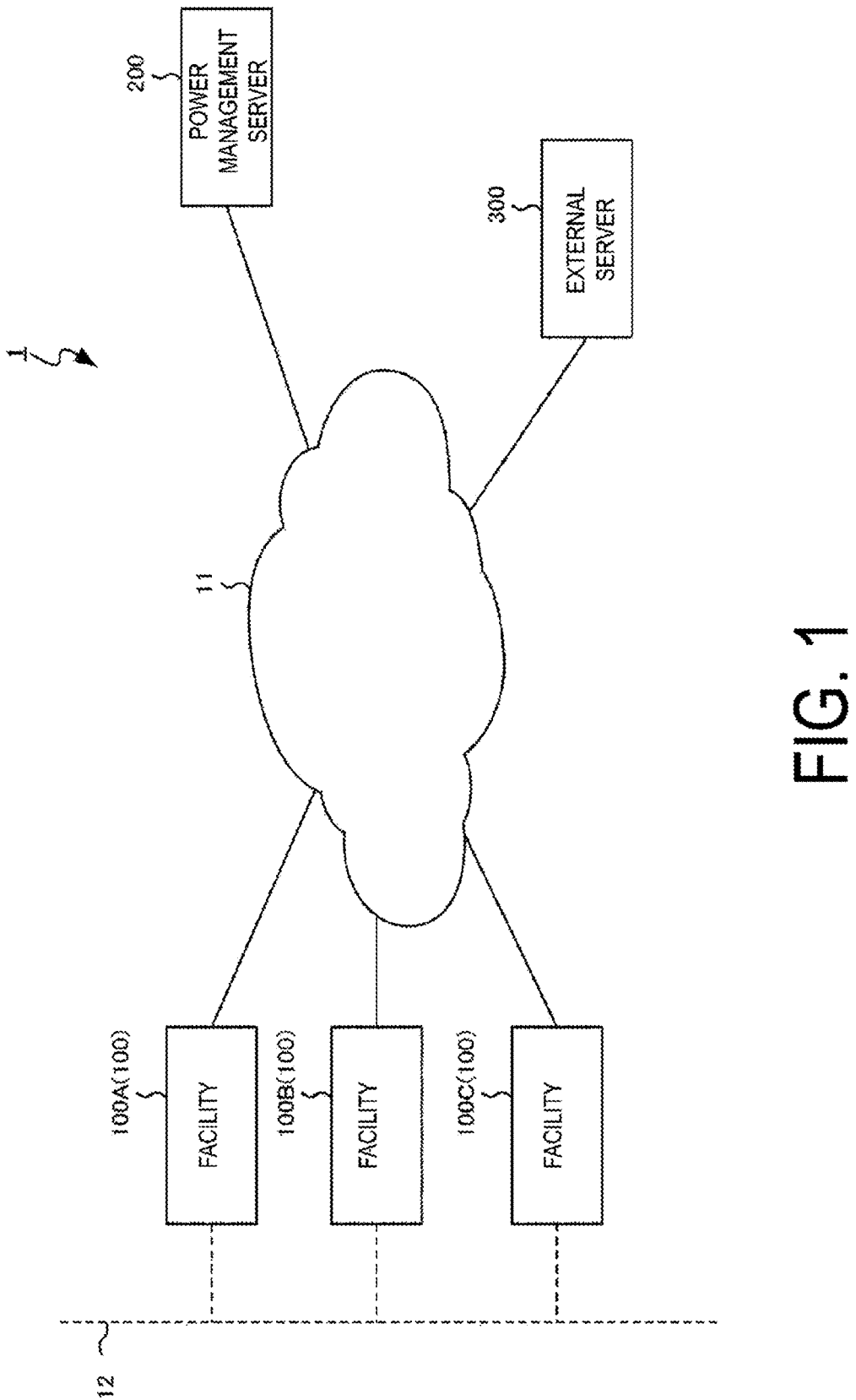
FIG. 1 illustrates a power management system 1 according to an embodiment.

A power management system according to an embodiment will be described below. As illustrated in FIG. 1, a power management system 1 includes a facility 100. The power management system 1 may include a power management server 200 and an external server 300.

Here, the facility 100, the power management server 200, and the external server 300 are configured to be communicable with each other via a network 11. The network 11 may include the Internet, a dedicated line such as a virtual private network (VPN), or a mobile communication network.

The facility 100 is interconnected with the power system 12, and may receive power from the power system 12 or may supply power to the power system 12. The power from the power system 12 to the facility 100 may be referred to as flow power or purchased power. Power from the facility 100 to the power system 12 may be referred to as reverse flow power or selling power. FIG. 1 illustrates facilities 100A to 100C as examples of the facility 100.

The facility 100 may be and is not particularly limited to a facility such as, for example, a residence, a shop, or an office. The facility 100 may be a residential complex including two or more residences. The facility 100 may be a complex facility including at least two facilities of residences, stores, and offices. The details of the facility 100 will be described later (see FIG. 2).

The power management server 200 is a server managed by a business operator, such as a power generation operator, a power transmission and distribution operator, a retailer, or a resource aggregator. The resource aggregator is a power company that adjusts the power supply-demand balance in the power system 12 in a virtual power plant (VPP). Adjusting the power supply-demand balance may include a transaction of exchanging the reduced demand power (flow power) of the facility 100 for value (hereinafter referred to as negawatt transaction). Adjusting the power supply-demand balance may include a transaction of exchanging the increased reverse flow power for value. The resource aggregator is a power company that supplies the reverse flow power to the power generation operator, the power transmission and distribution operator, the retailer, or the like, in the VPP.

The power management server 200 may manage information on power outage (hereinafter referred to as planned power outage information) of the facility 100. The planned power outage information may include information on a predetermined planned power outage. The planned power outage information may include information indicating a time zone in which the planned power outage occurs.

The external server 300 is a server that manages various types of information. The external server 300 may manage information on the power outage of the facility 100 (hereinafter referred to as power outage impact information). For example, the external server 300 is a server that manages weather information. The power outage impact information may include disaster information such as an emergency warning for heavy rain, flooding information, a landslide alert information, flood hazard information, a heavy rain warning, flood warning, an overflow alert, an overflow advisory, a heavy rain advisory, and a flood advisory.

Facility

Figure 2:
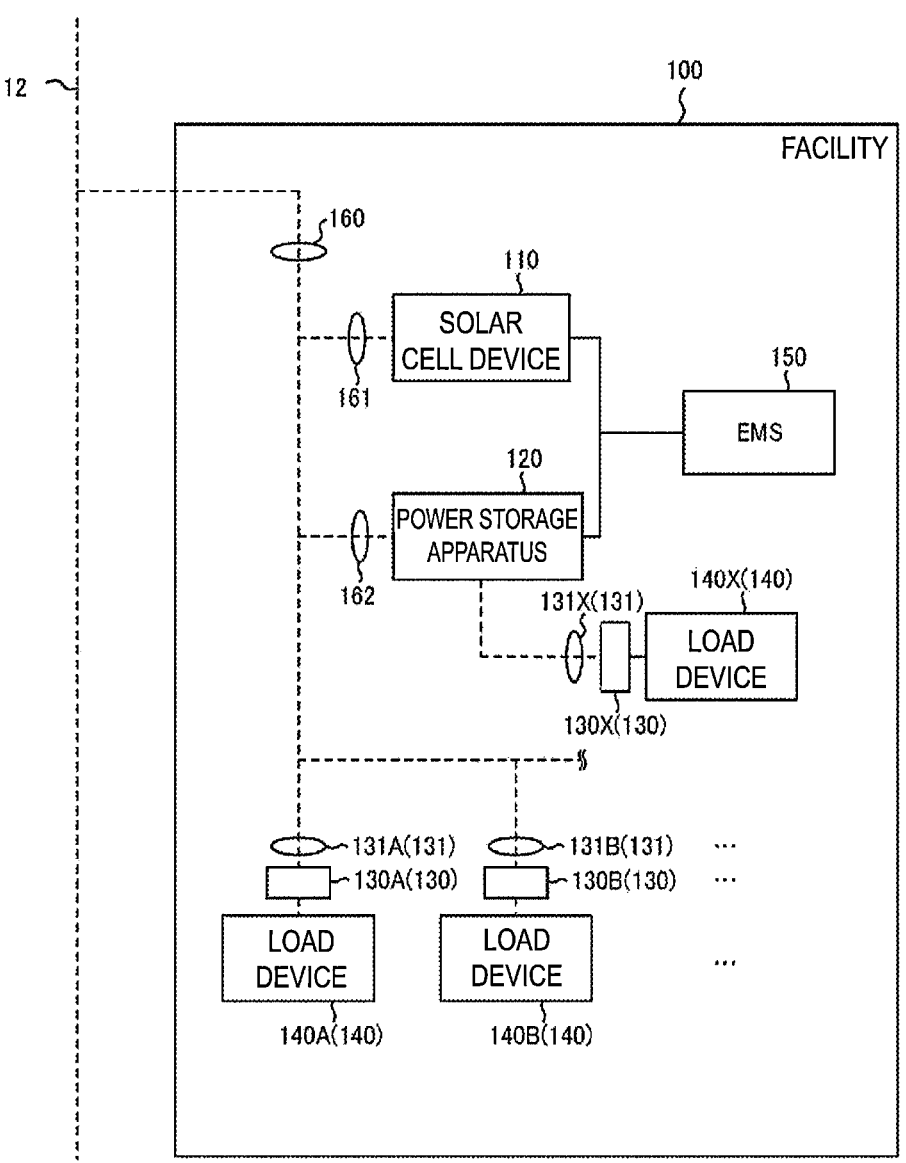
FIG. 2 illustrates a facility 100 according to the embodiment.

The facility according to the embodiment will be described below. As illustrated in FIG. 2, the facility 100 includes a solar cell apparatus 110, a power storage apparatus 120, a power socket 130, a load device 140, and an energy management system (EMS) 150. The facility 100 may include a measurement device 160, a measurement device 161, and a measurement device 162.

The solar cell apparatus 110 is a distributed power supply that generates power in response to sunlight or other light. For example, the solar cell apparatus 110 is composed of a power conditioning system (PCS) and a solar panel. In the embodiment, the solar cell apparatus 110 is an example of a power generation apparatus provided in the facility 100.

The power storage apparatus 120 is a distributed power supply that charges the power and discharges the power. For example, the power storage apparatus 120 is composed of a PCS and a power storage cell.

The power socket 130 is a connection interface into which a plug of the load device 140 is inserted. The power socket 130 may include a measurement device 131 that measures, at a predetermined interval (for example, 30 seconds), power (power consumption) supplied to the load device 140 connected to the power socket 130. The power socket 130 may include a relay that interrupts power supply to the load device 140.

The measurement device 131 may measure power consumption or may measure a current for identifying power consumption. The predetermined interval may be referred to as a sampling interval. The measurement device 131 transmits the measurement result of the measurement device 131 to the EMS 150. The individual measurement results may be transmitted at a sampling interval. Some measurement results may be collectively transmitted at an interval longer than the sampling interval. The measurement results may be expressed as instantaneous values or integrated values.

In FIG. 2, as the power socket 130, a power socket 130A, a power socket 130B, and a power socket 130X are illustrated. As the measurement device 131, a measurement device 131A, a measurement device 131B, and a measurement device 131X are illustrated. The power socket 130A supplies AC power to the load device 140A connected to the power socket 130A, and the measurement device 131A measures the power consumption of the load device 140A. Similarly, the power socket 130B supplies AC power to the load device 140B connected to the power socket 130B, and the measurement device 131B measures the power consumption of the load device 140B. On the other hand, the power socket 130X supplies DC power to the load device 140X connected to the power socket 130X, and the measurement device 131X measures the power consumption of the load device 140X.

The load device 140 is a device that consumes power. For example, the load device 140 may include a video device, an audio device, a refrigerator, a washing machine, an air conditioner, a personal computer, and the like.

In FIG. 2, as the load device 140, a load device 140A, a load device 140B, and a load device 140X are illustrated. The load device 140A represents the load device connected to the power socket 130A, and may refer to a different load device. Similarly, the load device 140B represents the load device connected to the power socket 130B and may refer to a different load device, while the load device 140X represents the load device connected to the power socket 130X and may refer to a different load device.

The EMS 150 manages the power related to the facility 100. The EMS 150 may control the solar cell apparatus 110, the power storage apparatus 120, and the load device 140. In the embodiment, the EMS 150 is an example of a power management apparatus. The details of the EMS 150 will be described later (see FIG. 3).

The measurement device 160 measures the flow power from the power system 12 to the facility 100. The measurement device 160 may measure the reverse flow power from the facility 100 to the power system 12. For example, the measurement device 160 may be a smart meter that belongs to a power company. The measurement device 160 may transmit an information element indicating the measurement result (an integrated value of flow power or reverse flow power) in a first interval (for example, 30 minutes) to the EMS 150 at first intervals.

The measurement device 161 measures the output power of the solar cell apparatus 110. The measurement device 161 may transmit an information element indicating the measurement result in a second interval (for example, one minute) shorter than the first interval to the EMS 150 at second intervals. The measurement result may be expressed as an instantaneous value or an integrated value.

The measurement device 162 measures a charging power and a discharging power of the power storage apparatus 120. The measurement device 162 may transmit an information element indicating the measurement result in the second interval (for example, one minute) shorter than the first interval to the EMS 150 at second intervals. The measurement result may be expressed as an instantaneous value or an integrated value.

Power Management Apparatus

Figure 3:
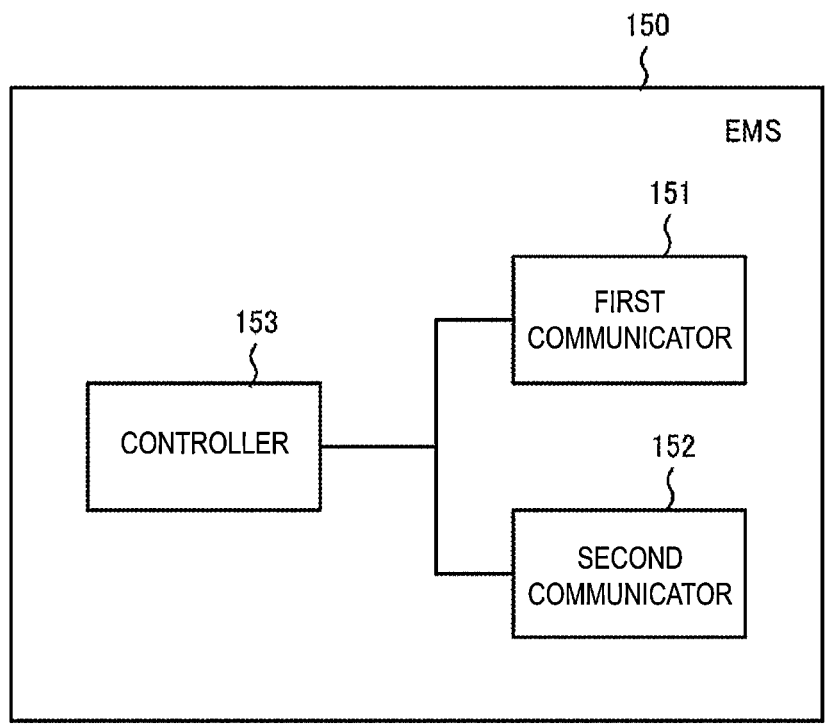
FIG. 3 illustrates an EMS 150 according to the embodiment.

The power management apparatus according to the embodiment will be described below. As described above, the EMS 150 is an example of a power management apparatus. As illustrated in FIG. 3, the EMS 150 includes a first communicator 151, a second communicator 152, and a controller 153.

The first communicator 151 is composed of a communication module. The communication module may be a wireless communication module compliant with a standard such as IEEE 802.11a/b/g/n/ac/ax, ZigBee, Wi-SUN, LTE, 5G, 6G, or the like, or may be a wired communication module compliant with a standard such as IEEE 802.3, a unique dedicated protocol, or the like.

The first communicator 151 may communicate with the power management server 200 via the network 11. The first communicator 151 may communicate with the external server 300 via the network 11.

In the embodiment, the first communicator 151 may constitute a receiver that receives information on the power outage of the facility 100. For example, the first communicator 151 may receive planned power outage information from the power management server 200 or may receive power outage impact information from the external server 300.

The second communicator 152 is composed of a communication module. The communication module may be a wireless communication module compliant with a standard such as IEEE 802.11a/b/g/n/ac/ax, ZigBee, Wi-SUN, LTE, 5G, 6G, or the like, or may be a wired communication module compliant with a standard such as IEEE 802.3, a unique dedicated protocol, or the like.

The second communicator 152 executes communication with the measurement device 131. The second communicator 152 may execute communication with the solar cell apparatus 110 and the power storage apparatus 120. Although signal lines are omitted in FIG. 2, the second communicator 152 may execute communication with the power socket 130 and the load device 140, and may execute communication with the measurement device 160, the measurement device 161, and the measurement device 162.

In the embodiment, the second communicator 152 constitutes an acquiring unit that acquires the measurement result of the measurement device 131 as time-series data from the measurement device 131.

The controller 153 controls the EMS 150. The controller 153 may include at least one processor. The at least one processor may be composed of a single integrated circuit (IC) or two or more circuits (such as integrated circuits and/or discrete circuits) connected communicable with each other.

The controller 153 may control the solar cell apparatus 110 and the power storage apparatus 120. The controller 153 may control the power socket 130 and the load device 140. For example, the controller 153 may cut off power supply from the power socket 130 to the load device 140 by controlling a relay of the power socket 130.

In the embodiment, the controller 153 constitutes a controller that executes, when the time-series data satisfies a first condition, first processing of classifying the time-series data into first time-series data which is time-series data before the first condition is satisfied and second time-series data which is time-series data after the first condition is satisfied.

Here, the first condition stipulates that a difference between an n-th round (n is an integer of 1 or more) measurement result and an (n+x)-th round (x is an integer of 2 or more) measurement result is equal to or larger than a predetermined difference. The value of x may be determined according to the sampling interval of the measurement result of the measurement device 131.

For example, the shorter the sampling interval is, the larger the value of x may be. With such a configuration, the short sampling interval allows appropriate classification of the first time-series data and the second time-series data even when the power consumption changes without the difference between the successive measurement results exceeding the predetermined difference.

On the other hand, the longer the sampling interval is, the smaller the value of x may be. With such a configuration, even with the long sampling interval, a delay of the timing for classifying the time-series data into the first time-series data and the second time-series data can be suppressed. However, since the value of x is 2 or more, classification into the first time-series data and the second time-series data can be appropriately performed even when the sampling of a measurement result is performed during the change of the power consumption.

Figure 4:
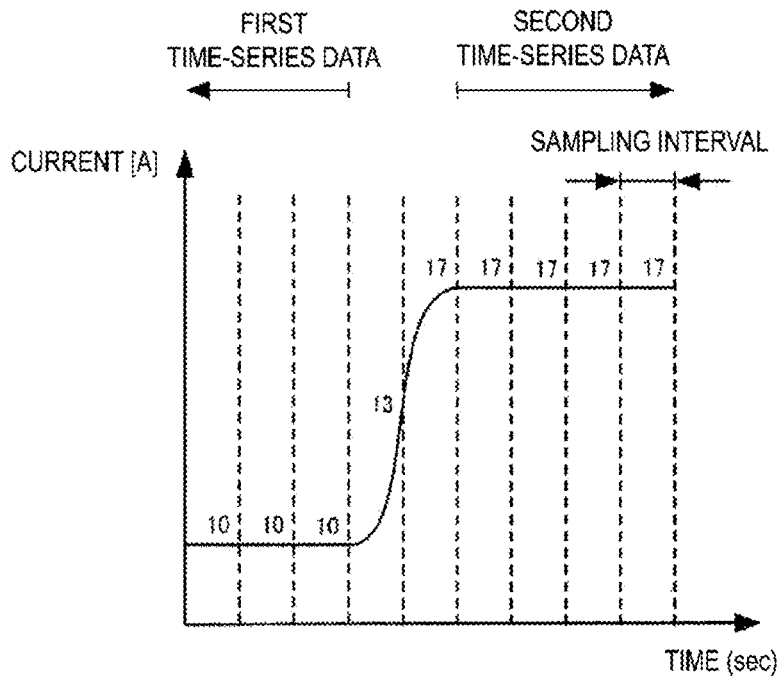
FIG. 4 is a graph for explaining first processing according to the embodiment.
Figure 5:
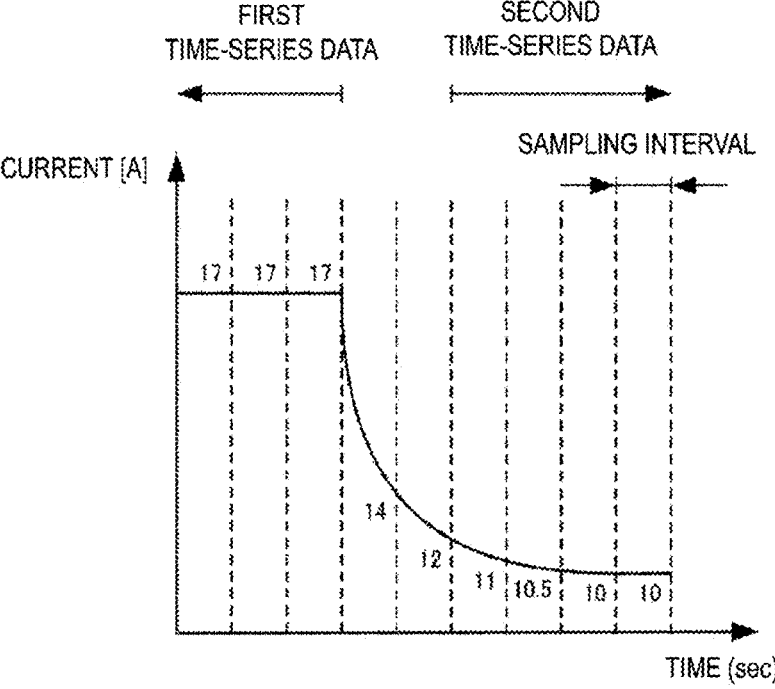
FIG. 5 is a graph for explaining the first processing according to the embodiment.
Figure 6:
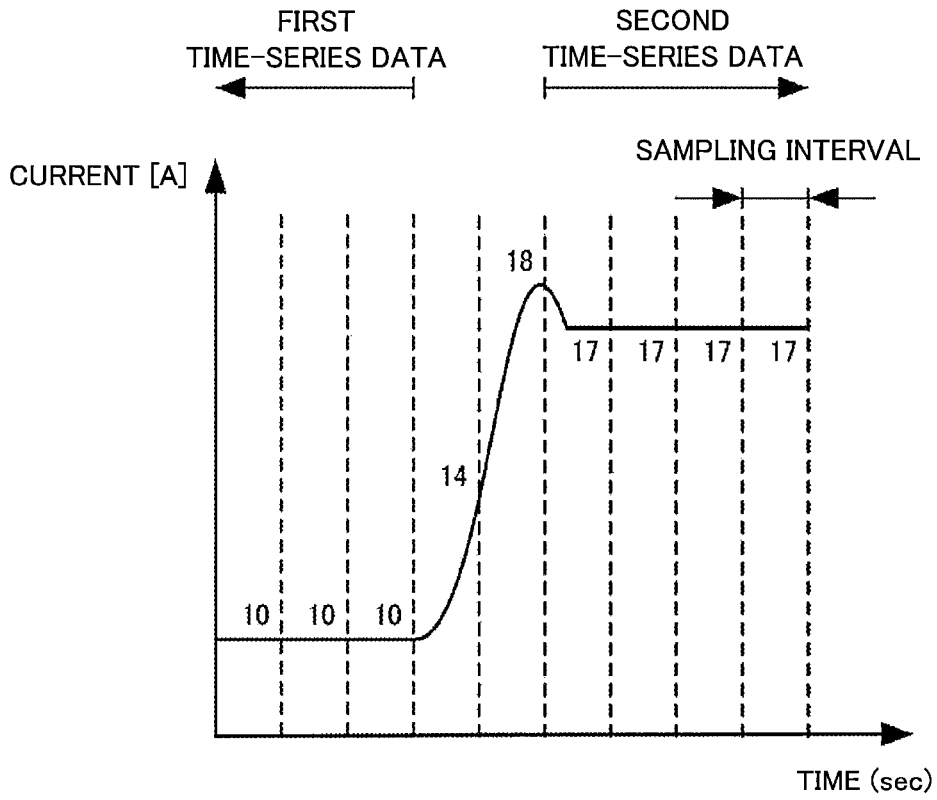
FIG. 6 is a graph for explaining the first processing according to the embodiment.

Specifically, the controller 153 classifies the first time-series data and the second time-series data by a method described below. In FIGS. 4 to 6, the vertical axis indicates the measurement result of the measurement device 131. The measurement result is represented by a current for identifying the power consumption of the load device 140 connected to the power socket 130. Here, a case in which the value of x is 2 and the predetermined difference is 5A is described as an example.

First, a case in which the power consumption increases is explained with reference to FIG. 4. As shown in FIG. 4, the controller 153 acquires {10, 10, 10, 13, 17, 17, 17, 17, 17} as the time-series data. The controller 153 acquires {0, 3, 7, 4, 0, 0, 0} as differences each between the n-th round measurement result and the (n+2)-th round measurement result. The controller 153 determines that the first condition is satisfied at the timing when a difference is 7A, and classifies {10, 10, 10, 13} as the first time-series data, and {17, 17, 17, 17, 17} as the second time-series data.

As is clear from the case shown in FIG. 4, when the value of x is 1, differences each between the measurement results are {0, 0, 3, 4, 0, 0, 0, 0}, which do not satisfy the first condition, and there is a possibility that classification into the first time-series data and the second time-series data cannot be appropriately performed.

Second, a case in which power consumption decreases is explained with reference to FIG. 5. As shown in FIG. 5, the controller 153 acquires {17, 17, 17, 14, 12, 11, 10.5, 10, 10} as the time-series data. The controller 153 acquires {0, 3, 5, 3, 1.5, 0.5, 0} as differences each between the n-th round measurement result and the (n+2)-th round measurement result. The controller 153 determines that the first condition is satisfied at the timing at which a difference is 5A, and classifies {17, 17, 17, 14, 12} as the first time-series data and {11, 10.5, 10, 10} as the second time-series data.

As is clear from the case shown in FIG. 5, when the value of x is 1, differences each between the measurement results is {0, 0, 0, 3, 2, 1, 0.5, 0.5}, which do not satisfy the first condition, and there is a possibility that classification into the first time-series data and the second time-series data cannot be appropriately performed.

Third, assuming that the load device includes an inverter, a case in which power consumption increases is explained with reference to FIG. 6. As shown in FIG. 6, the controller 153 acquires {10, 10, 10, 14, 18, 17, 17, 17, 17} as time-series data. The controller 153 acquires {0, 4, 8, 3, 0, 0, 0} as differences each between the n-th round measurement result and the (n+2)-th round measurement result. The controller 153 determines that the first condition is satisfied at the timing at which a difference is 8A, and classifies {10, 10, 10, 14} as the first time-series data and {18, 17, 17, 17, 17} as the second time-series data.

As is clear from the case shown in FIG. 6, when the value of x is 1, differences each between the measurement results is {0, 0, 4, 4, 1, 0, 0, 0}, which do not satisfy the first condition, and there is a possibility that classification into the first time-series data and the second time-series data cannot be appropriately performed.

In the embodiment, on the assumption that the first time-series data corresponds to time-series data of the first load device and the second time-series data corresponds to time-series data of the second load device, the controller 153 executes the second processing of predicting the power consumption of the second load device based on the second time-series data.

The first load device and second load device are terms introduced herein in order that the EMS 150 predicts the power consumption of the load device 140 connected to the power socket 130, and do not intend to mean that different load devices 140 are actually provided.

For example, it may be assumed that, when different load devices 140 are connected to the power socket 130, the actual load device 140 before being reconnected to the power socket 130 is the first load device, and the actual load device 140 after being reconnected to the power socket 130 is the second load device. In such a case, the load devices 140 are actually different. Alternatively, a case in which two or more load devices 140 are connected to the power socket 130 may be assumed. In such a case, a combination of two or more load devices 140 may correspond to the first load device or the second load device.

On the other hand, upon change of the operation mode of the load device 140 connected to the power socket 130, the actual load device 140 before the operation mode is changed may be assumed to be the first load device, and the actual load device 140 after the operation mode is changed may be assumed to be the second load device. In such a case, the actual load devices 140 are the same.

In the embodiment, the controller 153 executes third processing of identifying remaining operable time of the power storage apparatus 120 based on the prediction result of the power consumption of the second load device and the remaining power storage level of the power storage apparatus 120 installed in the facility 100. The remaining operable time may be a time period until the remaining power storage level of the power storage apparatus 120 becomes lower than a threshold value when the second load device is continuously used.

In the embodiment, the controller 153 may execute the first processing in a state in which the facility 100 is disconnected from the power system 12 (hereinafter, referred to as a disconnection state). In the disconnection state, the controller 153 may execute processing (second processing and third processing) on the premise of the first processing. The disconnection state may be read as the power outage state.

In the third processing, the controller 153 may identify the remaining operable time of the power storage apparatus 120 based on the prediction result of the power consumption of the second load device, the remaining power storage level of the power storage apparatus 120, and the prediction result of the power generated by the power generation apparatus (which is herein the solar cell apparatus 110) installed in the facility 100. That is, the controller 153 extends the remaining operable time of the power storage apparatus 120 based on the prediction result of the power generated by the solar cell apparatus 110.

For example, the controller 153 may identify the remaining operable time of the power storage apparatus 120 based on the following equation.

$$P_i = P_0 + \sum_{n=1}^{i} (G_n - C_n) \qquad \text{Equation 1}$$

$P_i$ . . . Remaining power storage level of the power storage apparatus 120 at time i $P_0$ . . . Remaining power storage level of the power storage apparatus 120 at the current time $G_n$ . . . Prediction result of generated power at time i $C_n$ . . . Prediction result of power consumption at time i The remaining operable time can be identified as the time when $P_i \geq 0$ is satisfied. In other words, the remaining operable time is the time until $P_i \leq 0$ is reached.

Power Management Method

A power management method according to the embodiment will be described below. Here, the operation of the EMS 150 is mainly described.

Figure 7:
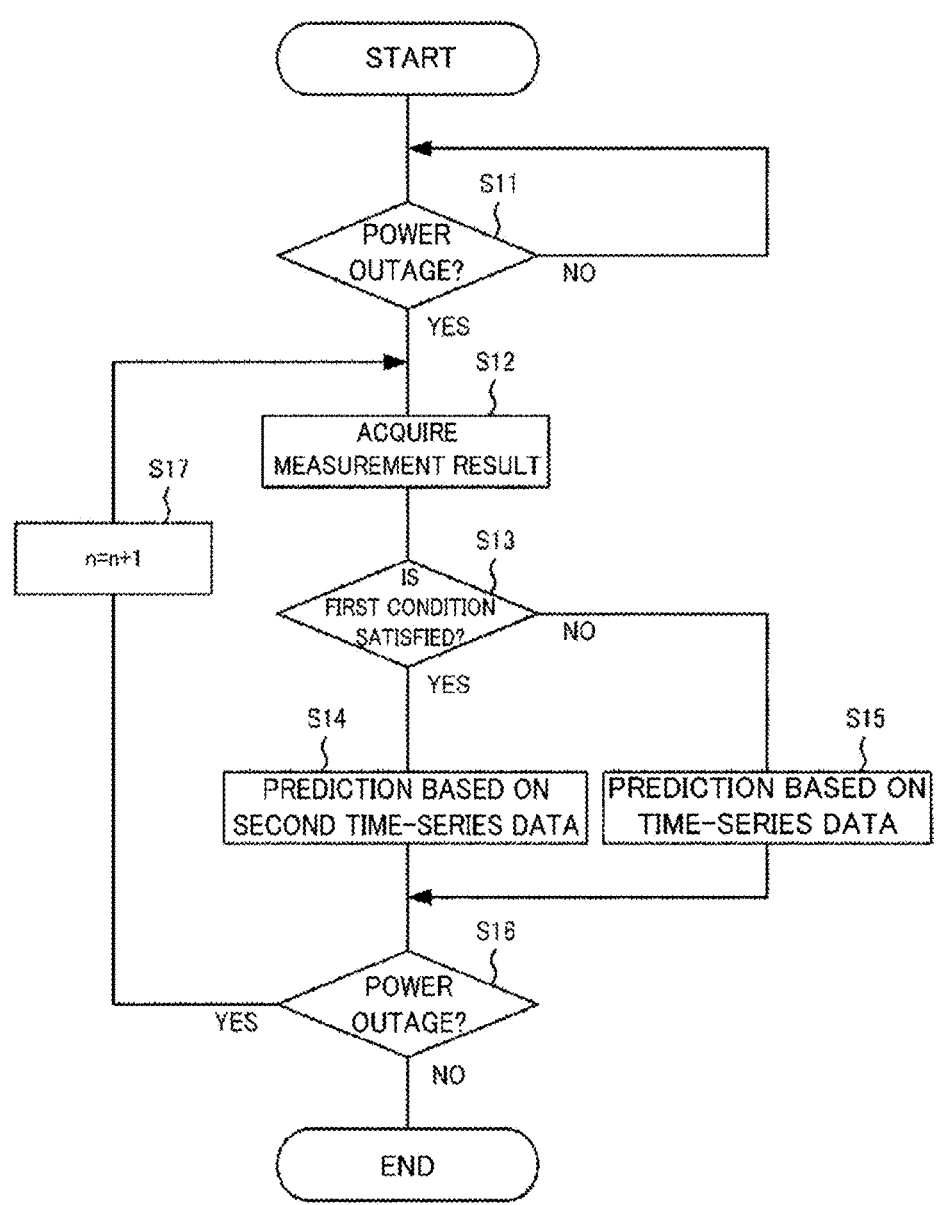
FIG. 7 is a chart showing a power management method according to the embodiment.

As shown in FIG. 7, the EMS 150 determines whether the power outage is occurring in the facility 100 in step S11. The EMS 150 executes the processing of step S12 during the power outage. During no power outage, the EMS 150 continues monitoring whether the power outage is occurring.

In step S12, the EMS 150 acquires a measurement result of the measurement device 131 from the measurement device 131. Here, a case in which a measurement result is obtained at sampling intervals is described as an example.

In step S13, the EMS 150 determines whether the first condition is satisfied. When the first condition is satisfied, the EMS 150 executes the processing of step S14. When the first condition is not satisfied, the EMS 150 executes the processing of step S15.

In step S14, the EMS 150 executes the first processing of classifying the time-series data into the first time-series data and the second time-series data. The EMS 150 executes the second processing of predicting the power consumption of the load device 140 (second load device) connected to the power socket 130 based on the second time-series data. The EMS 150 may execute the third processing of identifying the remaining operable time of the power storage apparatus 120 based on the prediction result of the power consumption and the remaining power storage level of the power storage apparatus 120.

In step S15, the EMS 150 predicts the power consumption of the load device 140 connected to the power socket 130 based on the time-series data without classification into the first time-series data and the second time-series data. The EMS 150 may identify the remaining operable time of the power storage apparatus 120 based on the prediction result of the power consumption and the remaining power storage level of the power storage apparatus 120.

In step S16, the EMS 150 determines whether the power outage of the facility 100 continues. The EMS 150 executes the processing of step S17 when the power outage of the facility 100 continues. When the power outage does not continue in the facility 100, the EMS 150 ends a series of processings.

In step S17, the EMS 150 executes preparation to acquire the next measurement result. For example, the EMS 150 adds 1 to a parameter n which identifies a measurement result.

Actions and Effects

In the embodiment, when the time-series data satisfies the first condition, the EMS 150 executes the first processing of classifying the time-series data into the first time-series data which is time-series data before the first condition is satisfied and the second time-series data which is time-series data after the first condition is satisfied. On the assumption that the first time-series data corresponds to time-series data of the first load device and the second time-series data corresponds to time-series data of the second load device, the EMS 150 executes the second processing of predicting the power consumption of the second load device based on the second time-series data. With such a configuration, when the power consumption of the load device 140 connected to the power socket 130 changes, the EMS 150 predicts power consumption based on the second time-series data without referring to the first time-series data. This allows the EMS 150 to appropriately predict power consumption at an early timing.

In the embodiment, the EMS 150 may execute third processing of identifying the remaining operable time of the power storage apparatus 120 based on the prediction result of the power consumption and the remaining power storage level of the power storage apparatus 120. With such a configuration, the EMS 150 can provide, to users of the facility 100, information that is useful when they consider the usage plan of the load device 140, in the disconnection state (a power outage state or the like) in which power is not supplied from the power system 12.

Variation 1

A variation 1 of the embodiment will be described below. In the variation 1, what differs from the embodiment described above is mainly described.

In the variation 1, a case is considered in which the load device 140 connected to the power socket 130 performs intermittent operations. The intermittent operations are assumed to be, for example, the operation of a refrigerator to maintain the inside temperature at the target temperature, the operation of an air conditioner to maintain the inside temperature at the target temperature, and the like.

In such cases, the EMS 150 determines that the time-series data corresponds to that of a single load device without classifying the time-series data when the first condition is satisfied in the first processing and the time-series data satisfies the second condition. The second condition stipulates that the time-series data includes a time interval of the measurement result corresponding to the first power, or both a time interval of the measurement result corresponding to the second power different from the first power and a time interval of the measurement result corresponding to the first power.

Figure 8:
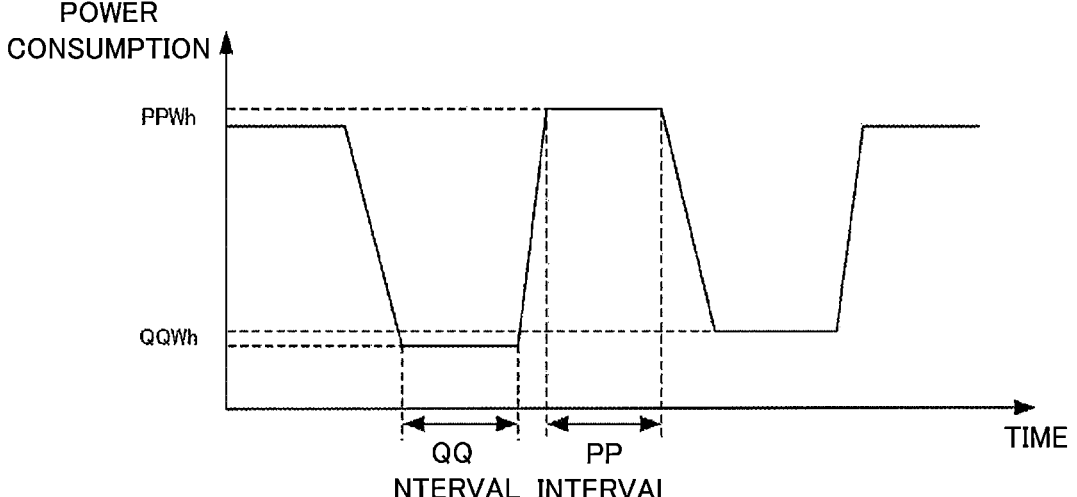
FIG. 8 is a graph for explaining first processing according to a variation 1.

For example, as shown in FIG. 8, a case in which power consumption of the load device 140 varies between PPWh and QQWh is considered. Here, the time interval of PPWh is referred to as a PP interval, and the time interval of QQWh is referred to as a QQ interval. That is, a case in which the PP interval at PPWh and the QQ interval at QQWh are repeated is considered. PPWh and QQWh may be the power consumption having a predetermined variation range.

When the power consumption of the load device 140 decreases from PPWh to QQWh, the EMS 150 classifies the time-series data into the first time-series data and the second time-series data. However, when the power consumption of the load device 140 increases from QQWh to PPWh, the EMS 150 determines that the second condition is satisfied because the time-series data includes the PP interval and the QQ interval. In other words, the EMS 150 handles the time-series data that has been classified into the first time-series data and the second time-series data as the time-series data corresponding to that of one load device without classifying the time-series data into the first time-series data and the second time-series data. Therefore, the EMS 150 predicts the power consumption of the load device 140 connected to the power socket 130 based on PPWh, the PP interval, QQWh, and the QQ interval. The EMS 150 may determine that the second condition is satisfied when the PP interval and the QQ interval are measured alternately and repeatedly a predetermined number of times. If the first processing is already executed when the second condition is satisfied, the EMS 150 may make a change such that the first processing is canceled and the first time-series data and the second time-series data are handled as one time-series data.

Furthermore, the EMS 150 limits the power supplied from the power socket 130 to the load device 140 for a time interval longer than the time interval of the measurement result corresponding to the smaller of the first power and the second power.

For example, in the case shown in FIG. 8, the EMS 150 limits the power supplied from the power socket 130 to the load device 140 for a time interval longer than the QQ interval. The power limit may be a limit that restricts the power consumption (PPWh) of the load device 140 to QQWh by extending the QQ interval. The power limit may be a limit that restricts the power consumption of the load device 140 to a predetermined power smaller than QQWh. The predetermined power may include 0 Wh.

Although FIG. 8 shows, as an example, a case in which the time-series data starts from the PP interval at PPWh, similar processing can be applied to a case in which the time-series data starts from the QQ interval at QQWh.

Power Management Method

Figure 9:
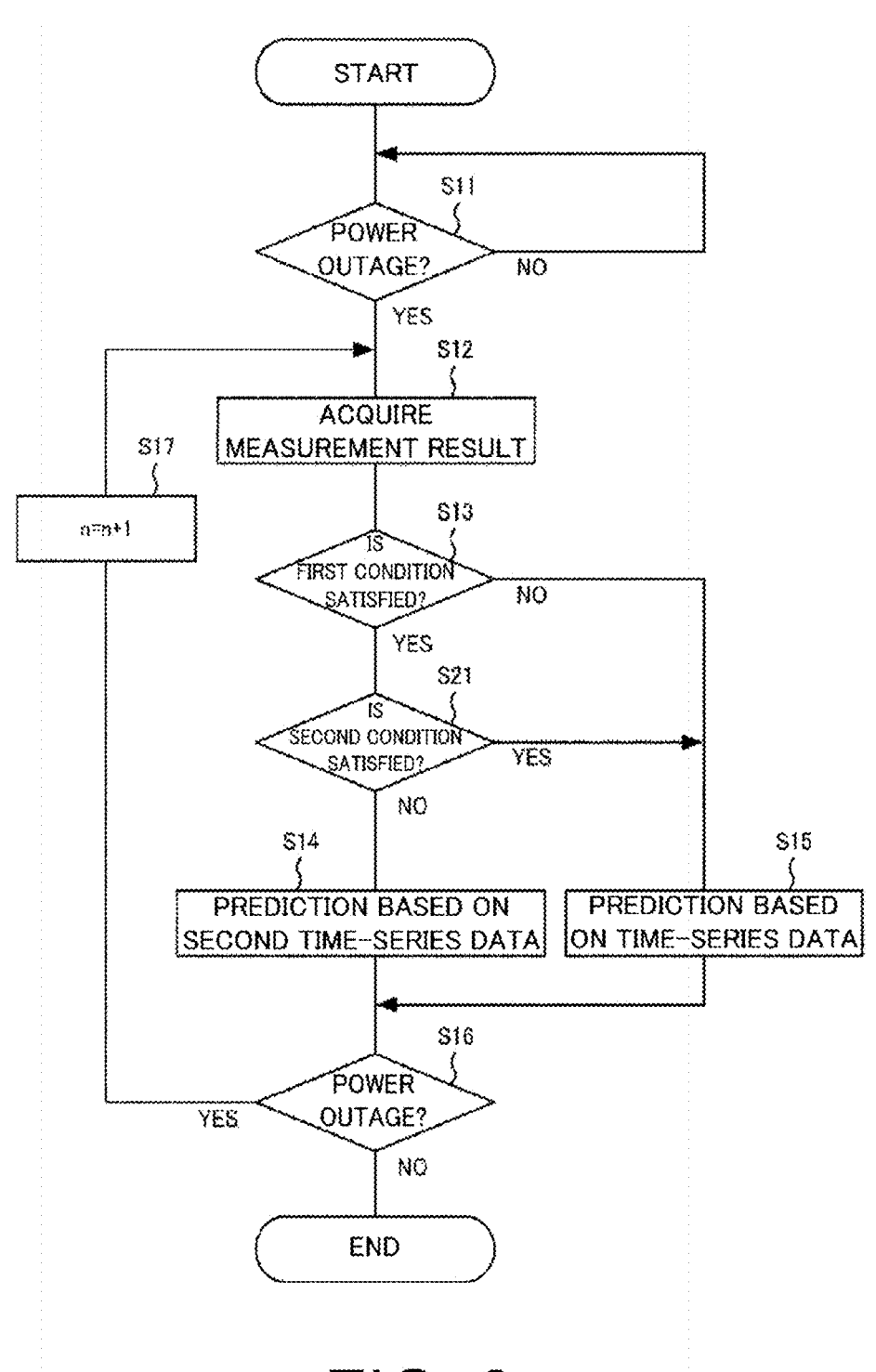
FIG. 9 is a chart showing a power management method according to the variation 1.

A power management method according to the variation 1 is described below. Here, the operation of the EMS 150 is mainly described. In FIG. 9, the same numbers are given to processing steps similar to those in FIG. 7. The description of the processing similar to that in FIG. 7 is omitted.

As shown in FIG. 9, the EMS 150 determines whether the second condition is satisfied in step S21. If the second condition is satisfied, the EMS 150 executes the processing of step S15. If the second condition is not satisfied, the EMS 150 executes the processing of step S14.

That is, when the second condition is satisfied after the first condition is satisfied, the EMS 150 predicts the power consumption of the load device 140 connected to the power socket 130 based on the time-series data in step S15, without classifying the time-series data into the first time-series data and the second time-series data.

On the other hand, if the second condition is not satisfied after the first condition is satisfied, the EMS 150 classifies the time-series data into the first time-series data and the second time-series data and predicts, based on the second time-series data, the power consumption of the load device 140 connected to the power socket 130 in step S14.

Actions and Effects

In the variation 1, when the first condition is satisfied and the time-series data satisfies the second condition, the EMS 150 predicts power consumption based on the time-series data without classifying the time-series data into the first time-series data and the second time-series data. With such a configuration, the power consumption of the load device 140 can be appropriately predicted even when the intermittent operation of the load device 140 is assumed.

Variation 2

A variation 2 of the embodiment will be described below. In the variation 2, what differs from the embodiment described above is mainly described.

In the variation 2, a method for predicting the power consumption of the second load device based on the second time-series data in a case in which the second time-series data (the power consumption of the second load device) is not further classified into different pieces of time-series data (that is, a case in which the second time-series data does not further satisfy the above-described first condition) is considered.

Specifically, in the second processing, the EMS 150 predicts the power consumption of the second load device based on a value which is larger than an average value (hereinafter, also referred to as Ave) of the second time-series data by an offset. The offset can be considered as a margin added to the average value of the second time-series data (the power consumption of the second load device). The offset may be represented by an absolute value to be added to the average value or may be represented by a ratio to be multiplied by the average value. A possible method for calculating the offset is the following method.

Figure 10:
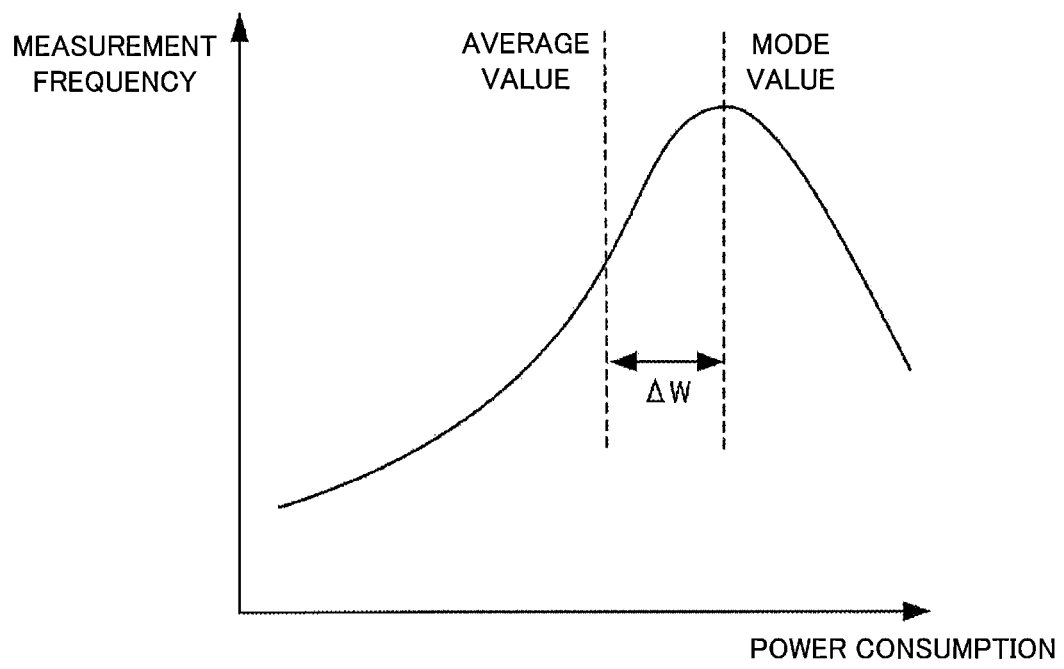
FIG. 10 is a graph for explaining offset according to a variation 2.

First, as shown in FIG. 10, the offset may be calculated based on a difference AW between the average value of the second time-series data and the mode value of the second time-series data. In such a case, the offset may be expressed by $C \cdot \Delta W$. C is a predetermined coefficient. That is, the EMS 150 predicts the power consumption based on $Ave + C \cdot \Delta W$. Specifically, the power consumption is predicted on the assumption that $Ave + C \cdot \Delta W$ continues.

Figure 11:
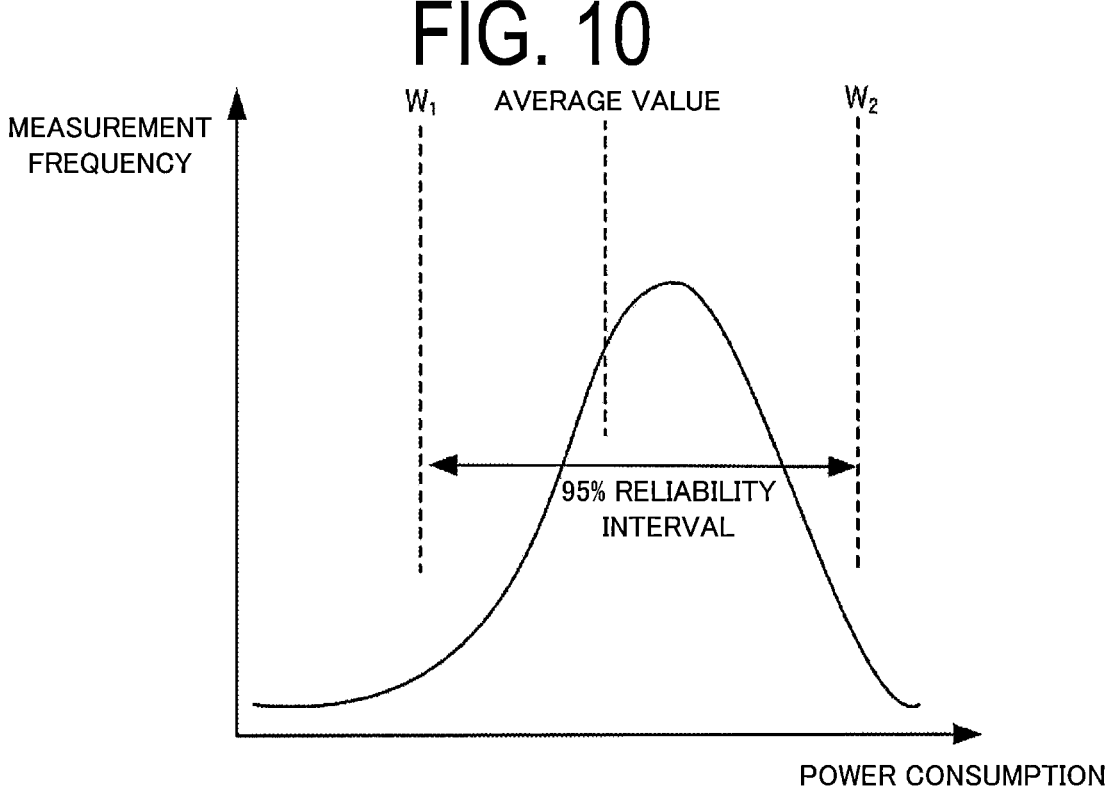
FIG. 11 is a graph for explaining the offset according to the variation 2.

Second, as shown in FIG. 11, the offset may be calculated based on the reliability interval of the second time-series data. The reliability interval is an interval of data having a predetermined reliability (for example, 95% reliability). In a case in which the minimum value of the 95% reliability interval of power consumption is $W_1$ and the maximum value thereof is $W_2$, the offset may be expressed by $C \cdot (W_2 - Ave)$. C is a predetermined coefficient. That is, the EMS 150 predicts power consumption based on $Ave + C \cdot (W_2 - Ave)$. Specifically, power consumption is predicted on the assumption that $Ave + C \cdot (W_2 - Ave)$ continues.

Third, as shown in FIG. 12, the offset may be associated with a range of past power consumption. For example, when the average value of the second time-series data is in a range from 1501 Wh to 2000 Wh, 150 Wh may be used as the offset. Similarly, when the average value of the second time-series data is in a range from 501 Wh to 1000 Wh, 50 Wh may be used as the offset.

In the variation 2, a case as an example is described in which the power consumption of the second load device is predicted based on the second time-series data. However, the variation 2 is not limited this example. The variation 2 may be applied to a case in which the power consumption of the load device 140 is predicted based on time-series data. In such a case, the second time-series data can be read as time-series data.

Actions and Effects

In second processing of the variation 2, the EMS 150 predicts the power consumption of the second load device based on a value larger than the average value of the second time-series data by the offset. With such a configuration, when assuming a case in which the power consumption of the second load device varies, the power consumption of the second load device is predicted as a larger power consumption. This suppresses the occurrence of a situation in which the remaining power storage level of the power storage apparatus 120 falls below a threshold value at an earlier timing than expected by the user of the facility 100.

Variation 3

A variation 3 of the embodiment is described below. In the variation 3, what differs from the embodiment described above is mainly described.

In the variation 3, the operation of the EMS 150 is described with reference to a user interface (UI) for users of the facility 100. The UI may be an image displayed on a display of the EMS 150 or an image displayed on a display of a terminal communicable with the EMS 150. The display may be constituted of a touch panel. On whatever device display the UI is displayed, the EMS 150 may perform display control related to the UI.

The following is an example of a case in which two or more power sockets 130 (a power socket 1, a power socket 2, a power socket 3, and a power socket DC) are installed in the facility 100, as the power socket 130. The power socket 130 to the power socket 3 are power sockets (for example, the power sockets 130A and 130B illustrated in FIG. 2) that supply AC power to the load devices 140, and the power socket DC is a power socket (for example, the power socket 130X illustrated in FIG. 2) that supplies DC power to the load device 140. As the UI, the UI shown in FIG. 13 is described as an example.

First, the UI may include an image ("Data Reacquisition" in FIG. 13) for inputting a user instruction to let the EMS 150 acquire a measurement result of the measurement device 131. The EMS 150 may execute the first processing and the second processing based on a user instruction. The EMS 150 may execute the third processing based on the user instruction. The EMS 150 may acquire a measurement result of the measurement device 131 before the user instruction or based on the user instruction.

Figure 13:
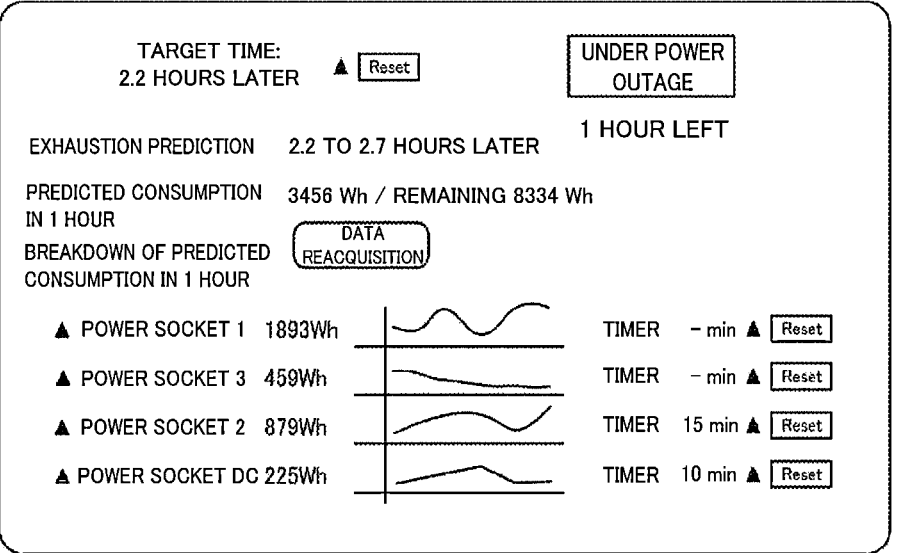
FIG. 13 is a view for explaining a UI according to a variation 3.

Second, the UI may include an image indicating the total power consumption of the load devices 140 connected to the respective power sockets 130 (in FIG. 13, "Predicted Consumption in 1 Hour" and "3456 Wh"). The UI may include an image indicating the remaining power storage level of the power storage apparatus 120 (in FIG. 13, "Remaining 8334 Wh"). The UI may include images indicating the power consumptions of the load devices 140 connected to the respective power sockets 130 (in FIG. 13, "Power Socket 1", "1893 Wh", "Power Socket 2", "459 Wh", "Power Socket 3", "879 Wh", "Power Socket DC", and "225 Wh"). The UI may include images indicating past power consumption records (in FIG. 13, graphs displayed on the right of the names and power consumptions of the respective power sockets).

Third, the UI may include an image indicating the remaining operable time (in FIG. 13, "Exhaustion Prediction", "2.2 to 2.7 Hours Later"). The remaining operable time may be expressed having a certain width. The UI may include an image indicating a power outage duration of the facility 100 (in FIG. 13, "Under Power Outage" and "1 Hour Left"). That is, the EMS 150 executes control for displaying the remaining operable time and the power outage duration.

The EMS 150 may predict the power consumption of the entire facility 100 based on the following equation. Specifically, the EMS 150 may calculate a minimum prediction result $C_{all\_min}$ of the power consumption of the entire facility 100 according to an equation $C_{all\_min}=C_{1\_min}+C_{2\_min}+C_{3\_min}+C_{dc\_min}$. $C_{1\_min}$, $C_{2\_min}$, $C_{3\_min}$, and $C_{dc\_min}$ are minimum values of time-series data (the second time-series data when the time-series data is classified) regarding the power socket 1, the power socket 2, the power socket 3, and the power socket DC, respectively. Similarly, the EMS 150 may calculate a maximum prediction result $C_{all\_max}$ of the power consumption of the entire facility 100 according to an equation $C_{all\_max}=C_{1\_max}+C_{2\_max}+C_{3\_max}+C_{dc\_max}$. $C_{1\_max}$, $C_{2\_max}$, $C_{3\_max}$, and $C_{dc\_max}$ are maximum values of the time-series data (the second time-series data when the time-series data is classified) for the power socket 1, the power socket 2, the power socket 3, and the power socket DC, respectively. The certain time width representing the remaining operable time may be defined by the prediction result $C_{all\_min}$ (for example, 2.2 Wh) and the prediction result $C_{all\_max}$ (for example, 2.7 Wh).

The EMS 150 may identify the power outage duration based on the information on the power outage of the facility 100 (for example, the above-described planned power outage information, power outage impact information, and the like). For example, when the planned power outage information includes information indicating the time zone in which the planned power outage occurs, the EMS 150 may identify the power outage duration based on the time zone in which the planned power outage occurs. Alternatively, the EMS 150 may identify a factor level of the power outage based on the power outage impact information and identify the power outage duration based on the identified factor level. For example, when the power outage impact information includes at least one of an emergency warning for heavy rain and flooding information, the EMS 150 may determine that the factor level is level 4 and identify the power outage duration on the assumption that the power outage should continue for two days. When the power outage impact information includes at least one of a landslide disaster alert information and flood hazard information, the EMS 150 may determine that the factor level is level 3 and identify the power outage duration on the assumption that the power outage should continue for one day. When the power outage impact information includes at least one of a heavy rain warning, a flood warning, and an overflow alert, the EMS 150 may determine that the factor level is level 2 and identify the power outage duration on the assumption that the power outage should continue for half a day. In a case in which the power outage impact information includes at least one of an overflow advisory, a heavy rain advisory, and a flood advisory, the EMS 150 may determine that the factor level is level 1 and identify the power outage duration as being unknown on the assumption that the power outage duration is a short period of time.

When the power outage duration of the facility 100 is longer than the remaining operable time of the power storage apparatus 120, the EMS 150 may execute fourth processing of limiting the power consumption of the load device 140. In other words, the EMS 150 limits the power consumption of the load device 140 so that power supply to the load device 140 can be continued until the power outage duration ends.

For example, in the fourth processing, the EMS 150 may set time when power supply from at least one power socket 130 to the load device 140 is to be stopped. The EMS 150 may automatically set, based on the set time, a timer described later for a time during which power can be supplied. The EMS 150 may select the power socket 130 that is caused to stop supplying power according to the priority among the power sockets 130. Alternatively, when the information (for example, an operation mode or the like) on the load device 140 can be acquired in the fourth processing, the EMS 150 may change the operation mode of the load device 140 to the operation mode having lower power consumption than the current operation mode.

In such a case, the EMS 150 may execute the fourth processing after a certain period of time has elapsed from the timing at which the facility 100 is disconnected from the power system 12. In other words, the EMS 150 need not perform the fourth processing in an instantaneous power outage.

Fourth, the UI may include an image indicating target duration of continued power supply to the load device 140 in the facility 100 (in FIG. 13, "Target Time" and "2.2 Hours Later"). The target duration may be read as a target operation time during which the operation of the power storage apparatus 120 continues. The UI may include an image used for setting the target duration (in FIG. 13, "▲" and "reset"). For example, the target duration may be increased by 0.1 hours by selecting or pressing "▲". The target duration may be reset by selecting or pressing "reset".

When the target duration is longer than the remaining operable time of the power storage apparatus 120, the EMS 150 may execute fifth processing of limiting the power consumption of the load device 140. In other words, the EMS 150 limits the power consumption of the load device 140 so that the power supply to the load device 140 can be continued until the target duration expires.

For example, in the fifth processing, the EMS 150 may set time when the power supply from at least one power socket 130 to the load device 140 is stopped. The EMS 150 may automatically set, based on the set time, a timer described later for a time during which power can be supplied. The EMS 150 may select the power socket 130 that is caused to stop supplying power according to the priority among the power sockets 130. Alternatively, when the information (for example, the operation mode or the like) on the load device 140 can be acquired in the fifth processing, the EMS 150 may change the operation mode of the load device 140 to an operation mode having lower power consumption than the current operation mode.

Fifth, the UI includes an image indicating the remaining time on a timer on which power supply time for continuously supplying power from the power socket 130 to the load device 140 can be set (in FIG. 13, "Timer-Minutes", "Timer 15 Minutes", and "Timer 10 Minutes"). The UI may include an image used for setting the power supply time (in FIG. 13, "▲" and "reset"). Such a timer may be provided for each power socket 130. In response to expiration of the power supply time on the timer, the EMS 150 stops power supply to the load device 140 from the power socket 130 provided with the timer on which the power supply time has expired. For example, the power supply time set on the timer may be increased in increments of one minute by selecting or pressing "▲". The power supply time set on the timer may be reset by selecting or pressing "reset".

When the target duration is longer than the remaining operable time of the power storage apparatus 120, the EMS 150 may shorten the power supply time set on the timer. For example, in the case illustrated in FIG. 13, the time of the timer for the power socket 2 may be shortened from 15 minutes to 9 minutes, and the time of the timer for the power socket DC may be shortened from 10 minutes to 3 minutes.

Sixth, the UI may include an image used to set the priority of the power supply of the power socket 130 (in FIG. 13, the "▲" displayed on the left of the name of each power socket). Although not particularly limited, the priority of the power socket 130 may be higher as it is displayed at a higher position. Alternatively, the UI may include an image indicating the priority of the power socket 130. For example, when "▲" is selected or pressed, the priority of the power socket 130 is changed to one level higher. Specifically, by selecting or pressing "▲" for the power socket 2, the display related to the power socket 2 may be moved to a higher position than the display related to the power socket 3. In response to such an operation, the EMS 150 sets, for each power socket 130, the priority of the power supply from the power socket 130 to the load device 140.

Actions and Effects

In the variation 3, the EMS 150 executes display control related to a UI including various pieces of information. With such a configuration, the EMS 150 can provide, to users of the facility 100, information that is useful when they consider the usage plan of the load device 140, in the disconnection state (such as the power outage state) in which power is not supplied from the power system 12.

In the variation 3, the EMS 150 may execute the fourth processing of limiting the power consumption of the load device 140 when the power outage duration of the facility 100 is longer than the remaining operable time of the power storage apparatus 120. Such a configuration can support the minimum necessary continuous use of the load device 140 until the expiration of the power outage duration.

In the variation 3, the EMS 150 may execute the fifth processing of limiting the power consumption of the load device 140 when the target duration is longer than the remaining operable time of the power storage apparatus 120. Such a configuration can support the minimum necessary continuous use of the load device 140 until the expiration of the target duration.

OTHER EMBODIMENTS

Although the present invention is described by the above-described embodiments, it should not be understood that the description and the drawings, which form a part of this disclosure, limit this invention. Various alternative embodiments, examples, and operational techniques will be apparent from this disclosure to those skilled in the art.

Although not particularly mentioned in the above disclosure, when the facility 100 is a residential complex or the like, the power sockets 130 may be installed in different residences. A usage mode in which two or more load devices 140 are connected to one power socket 130 may be conceivable.

Although not particularly mentioned in the above disclosure, the EMS 150 may identify the type of the load device 140 connected to the power socket 130 by learning past power consumption records. The learning may be machine learning or deep learning as typified by artificial intelligence (AI).

The above disclosure illustrates the case in which the solar cell apparatus 110 is installed in the facility 100 as the power generation apparatus. However, the embodiment is not limited to this example. The power generation apparatus may be one or more power generation apparatuses selected from a fuel cell device, a wind power generation apparatus, a water power generation apparatus, a geothermal power generation apparatus, and a biomass power generation apparatus.

The above disclosure illustrates the case in which the EMS 150 is provided in the facility 100. However, the disclosure described above is not limited to this example. The EMS 150 may be provided by a cloud service made utilizing a server on the network 11.

Although not particularly mentioned in the above disclosure, power may be expressed as an instantaneous value (W/KW) or an integrated value per unit time (Wh/kWh).

The above disclosure may have the following problems and effects.

Specifically, in a stand-alone operation situation in which the facility 100 is disconnected from the power system 12 due to a power outage or other reasons, a case is conceivable in which the load device 140 connected to the power socket 130 installed in the facility 100 is changed to a different load device 140. For example, such a case is assumed to be, for example, a case in which the user checks the remaining operable time of the power storage apparatus 120 for various load devices 140, or a case in which the load device that the user wants to use varies. As a result of diligent studies, the inventors have found it necessary to quickly identify the power consumption of load devices connected to a power socket, assuming the case in which different load devices are connected to the power socket.

To solve such a problem, in the above disclosure, the EMS 150 executes the second processing of predicting the power consumption of the second load device based on the second time-series data on the assumption that the first time-series data corresponds to time-series data of the first load device and the second time-series data corresponds to time-series data of the second load device. This configuration has an effect that the power consumption of the load device 140 connected to the power socket 130 can be quickly identified.

The invention claimed is:

1. A power management apparatus comprising:
   an acquiring unit configured to acquire, as time-series data, a measurement result of a measurement device from the measurement device, the measurement device being configured to measure, at a predetermined interval, power supplied to a load device from a power socket installed in a facility; and
   a controller including a processor configured to execute first processing of classifying the time-series data into first time-series data being time-series data before a first condition is satisfied and second time-series data being time-series data after the first condition is satisfied, when the time-series data satisfies a first condition, wherein
   on an assumption that the first time-series data corresponds to time-series data of a first load device and the second time-series data corresponds to time-series data of a second load device, the controller executes second processing of predicting power consumption of the second load device, based on the second time-series data, and

17 the first condition stipulates that a difference between an n-th round (n is an integer of 1 or more) measurement result and an (n+x)-th round (x is an integer of 2 or more) measurement result is equal to or greater than a predetermined difference.

2. The power management apparatus according to claim 1, wherein
the controller executes third processing of identifying a remaining operable time of a power storage apparatus installed in the facility, based on a prediction result of the power consumption of the second load device and a remaining power storage level of the power storage apparatus.

3. The power management apparatus according to claim 1, wherein
the controller executes the first processing and the second processing based on a user instruction.

4. The power management apparatus according to claim 1, wherein
when the first condition is satisfied in the first processing and the time-series data satisfies a second condition, the controller determines that the time-series data is time-series data corresponding to time-series data of one load device, without classifying the time-series data, and
the second condition stipulates that the time-series data comprises a time interval of a measurement result corresponding to a first power, or both a time interval of a measurement result corresponding to a second power different from the first power and the time interval of the measurement result corresponding to the first power.

5. The power management apparatus according to claim 4, wherein
the controller limits the power supplied from the power socket to the load device, in a time interval longer than the time interval of the measurement result corresponding to the smaller of the first power and the second power.

6. The power management apparatus according to claim 1, wherein
the controller executes the first processing in a state in which the facility is disconnected from a power system.

7. The power management apparatus according to claim 1, wherein
in the second processing, the controller predicts the power consumption of the second load device based on a value larger than an average value of the second time-series data by an offset.

8. The power management apparatus according to claim 2, wherein
in the third processing, the controller identifies a remaining operable time of the power storage apparatus based on the prediction result of the power consumption of the second load device, the remaining power storage level of the power storage apparatus, and a prediction result of power generated by a power generation apparatus installed in the facility.

9. The power management apparatus according to claim 1, further comprising:
when two or more power sockets are installed, a timer on which a power supply time for continuing power supply from the power socket to the load device can be set is provided for each of the power sockets, wherein
upon expiration of the power supply time on the timer, the controller stops power supply to the load device from the power socket provided with the timer on which the power supply time has expired.

10. The power management apparatus according to claim 2, further comprising:
a receiver configured to receive information on a power outage of the facility, wherein
the controller executes control for causing a power outage duration of the facility and a remaining operable time of the power storage apparatus to be displayed.

11. The power management apparatus according to claim 10, wherein
the controller identifies the power outage duration of the facility based on the information on the power outage of the facility.

12. The power management apparatus according to claim 10, wherein
the controller executes fourth processing of limiting power consumption of the load device when the power outage duration of the facility is longer than the remaining operable time of the power storage apparatus.

13. The power management apparatus according to claim 12, wherein
the controller executes the fourth processing after a certain period of time has elapsed from a timing at which the facility is disconnected from a power system.

14. The power management apparatus according to claim 2, wherein
the controller executes fifth processing of limiting power consumption of the load device when a target duration for continuing power supply to the load device is longer than the remaining operable time of the power storage apparatus in the facility.

15. The power management apparatus according to claim 1, wherein
when two or more power sockets are installed, the controller sets priority of power supply from the power socket to the load device for each of the power sockets.

16. The power management apparatus according to claim 9, wherein
the controller shortens the power supply time set on the timer, when a target duration for continuing power supply to the load device is longer than the remaining operable time of the power storage apparatus in the facility.

17. A power management method comprising:
acquiring, as time-series data, a measurement result of a measurement device from the measurement device, the measurement device being configured to measure, at a predetermined interval, power supplied to a load device from a power socket installed in a facility;
executing, by a processor, first processing of classifying the time-series data into first time-series data being time-series data before a first condition is satisfied and second time-series data being time-series data after the first condition is satisfied, when the time-series data satisfies a first condition; and
executing, by the processor, on an assumption that the first time-series data corresponds to time-series data of a first load device and the second time-series data corresponds to time-series data of a second load device, second processing of predicting power consumption of the second load device based on the second time-series data, wherein
the first condition stipulates that a difference between an n-th round (n is an integer of 1 or more) measurement result and an (n+x)-th round (x is an integer of 2 or more) measurement result is equal to or greater than a predetermined difference.

* * * * *